United States Patent
Sosnowski

(10) Patent No.: US 9,545,771 B2
(45) Date of Patent: Jan. 17, 2017

(54) MULTI-COMPONENT TILES

(71) Applicant: Gerald Joseph Sosnowski, Whitmore Lake, MI (US)

(72) Inventor: Gerald Joseph Sosnowski, Whitmore Lake, MI (US)

(*) Notice: Subject to any disclaimer, the term of this patent is extended or adjusted under 35 U.S.C. 154(b) by 0 days.

(21) Appl. No.: 14/670,985

(22) Filed: Mar. 27, 2015

(65) Prior Publication Data

US 2016/0053496 A1 Feb. 25, 2016

Related U.S. Application Data

(60) Provisional application No. 61/971,195, filed on Mar. 27, 2014.

(51) Int. Cl.

| | |
|---|---|
| *B32B 3/30* | (2006.01) |
| *B32B 3/06* | (2006.01) |
| *E04F 15/02* | (2006.01) |
| *E04F 15/10* | (2006.01) |
| *B32B 5/02* | (2006.01) |

(Continued)

(52) U.S. Cl.
CPC . *B32B 3/06* (2013.01); *B32B 3/30* (2013.01); *B32B 5/02* (2013.01); *B32B 5/16* (2013.01); *B32B 5/22* (2013.01); *B32B 5/26* (2013.01); *B32B 5/30* (2013.01); *B32B 7/12* (2013.01); *B32B 25/047* (2013.01); *B32B 25/10* (2013.01); *E04F 15/02038* (2013.01); *E04F 15/102* (2013.01); *E04F 15/107* (2013.01); *B32B 2250/02* (2013.01); *B32B 2260/021* (2013.01); *B32B 2260/025* (2013.01); *B32B 2260/046* (2013.01); *B32B 2262/10* (2013.01); *B32B 2262/101* (2013.01); *B32B 2264/0207* (2013.01); *B32B 2264/06* (2013.01); *B32B 2264/12* (2013.01); *B32B 2272/00* (2013.01); *B32B 2307/3065* (2013.01); *B32B 2307/50* (2013.01); *B32B 2307/54* (2013.01); *B32B 2307/546* (2013.01); *B32B 2307/5825* (2013.01); *B32B 2307/734* (2013.01); *B32B 2419/04* (2013.01); *E04F 2201/0138* (2013.01); *E04F 2201/021* (2013.01); *E04F 2201/0517* (2013.01); *E04F 2203/065* (2013.01)

(58) Field of Classification Search
CPC .............. E04F 15/02188; E04F 15/02038; B32B 3/06; B32B 3/30
USPC ........................................................ 52/591.5
See application file for complete search history.

(56) References Cited

U.S. PATENT DOCUMENTS

| | | | | |
|---|---|---|---|---|
| 4,694,627 | A | * | 9/1987 | Omholt ............... E04F 15/22 52/390 |
| 4,924,645 | A | * | 5/1990 | Abeln ............... E04F 15/02488 52/177 |

(Continued)

*Primary Examiner* — Beth Stephan
(74) *Attorney, Agent, or Firm* — Pearne & Gordon LLP

(57) ABSTRACT

Provided is a tile for concealing an underlying surface. The tile includes a base including a downward-facing surface that is to oppose an underlying surface on which the tile is to rest. The base is formed, at least in part, from a material including a combination of crumb rubber and rice hull material. A plurality of feet extend in a downwardly direction from the downward-facing surface to contact the underlying surface on which the tile is to rest and separate the downward-facing surface from the underlying surface. A cap is coupled to a surface of the base opposite the downward-facing surface comprising the feet.

5 Claims, 7 Drawing Sheets

(51) Int. Cl.
  *B32B 5/16*  (2006.01)
  *B32B 5/22*  (2006.01)
  *B32B 5/26*  (2006.01)
  *B32B 5/30*  (2006.01)
  *B32B 7/12*  (2006.01)
  *B32B 25/04*  (2006.01)
  *B32B 25/10*  (2006.01)

(56) References Cited

U.S. PATENT DOCUMENTS

| | | | | |
|---|---|---|---|---|
| 4,945,697 A * | 8/1990 | Ott | ............................ | E04F 15/22 404/31 |
| 5,253,464 A * | 10/1993 | Nilsen | ...................... | E04F 15/22 52/480 |
| 5,671,575 A * | 9/1997 | Wu | ........................ | E04F 15/022 52/403.1 |
| 6,468,629 B1 * | 10/2002 | Lodder | ...................... | B32B 5/18 428/141 |
| 6,918,215 B2 * | 7/2005 | Smith | ...................... | E04F 17/00 52/177 |
| 7,721,498 B2 * | 5/2010 | Kang | ........................ | E04F 15/22 52/177 |
| 2005/0158517 A1 * | 7/2005 | Rives | ........................ | E04F 15/18 428/158 |
| 2006/0032175 A1 * | 2/2006 | Chen | .......................... | B32B 3/04 52/578 |
| 2008/0066419 A1 * | 3/2008 | Stanchfield | ........ | E04F 15/02027 52/716.1 |
| 2008/0086958 A1 * | 4/2008 | Schroer | ................... | E02D 31/02 52/169.14 |
| 2008/0236097 A1 * | 10/2008 | Tinianov | .................... | E04C 2/20 52/787.11 |
| 2008/0289277 A1 * | 11/2008 | Stone | ....................... | E04F 15/10 52/302.1 |
| 2009/0126307 A1 * | 5/2009 | Grohman | ................. | E04F 15/02 52/588.1 |
| 2011/0016815 A1 * | 1/2011 | Yang | ........................ | E04F 15/02 52/396.04 |
| 2011/0045250 A1 * | 2/2011 | De Zen | ................ | B29C 47/0019 428/168 |
| 2011/0197543 A1 * | 8/2011 | Lee | ............................ | B32B 5/18 52/745.05 |
| 2013/0047537 A1 * | 2/2013 | Dao | ........................... | E04F 15/18 52/309.3 |
| 2013/0227903 A1 * | 9/2013 | Amend | .................... | B32B 37/14 52/309.4 |
| 2013/0283720 A1 * | 10/2013 | Pervan | ................. | E04F 13/0894 52/588.1 |
| 2014/0069039 A1 * | 3/2014 | Schluter | .................. | E04F 15/182 52/390 |

* cited by examiner

MULTI-COMPONENT TILES

CROSS-REFERENCE TO RELATED APPLICATIONS

This application claims the benefit of U.S. Provisional Application No. 61/971,195, filed Mar. 27, 2014, which is incorporated in its entirety herein by reference.

BACKGROUND OF THE INVENTION

1. Field of the Invention

This application relates generally to flooring materials and, more specifically, multi-component tiles that can include a base and a cap that can overlap with an adjacent tile, and/or multi-component tiles that include an integrally-formed, monolithic tile with a plurality of feet provided to an underside material and a connection component.

2. Description of Related Art

Conventional single-component tiles are often formed of a recycled material as a single, monolithic unit. Such tiles can be arranged in an array, abutting side-by-side, against each other. However, such tiles generally conform to the underlying surface on which they rest. Further, since the tiles simply abut against each other, water and other liquids can enter the space in between tiles, making cleanup difficult and making the ground beneath such tile systems susceptible to erosion.

For installations where the permeation of liquids between tiles to an underlying sub-base material, traditional tiles have required extensive installation efforts to ensure proper alignment. But even such installations have been prone to damage from water or other liquids that collect between such tiles and the sub-base material when the liquid accumulates faster than it can permeate the underlying sub-base material. The accumulated liquids can freeze or otherwise cause erosion of the sub-base material, and can also cause the tiles to shift relative to each other, creating unsightly gaps between the tiles.

BRIEF SUMMARY OF THE INVENTION

According to one aspect, the subject application involves a tile for concealing an underlying surface. The tile includes a base including a downward-facing surface that is to oppose an underlying surface on which the tile is to rest. The base is formed, at least in part, from a material including a combination of crumb rubber and rice hull material. A plurality of feet extend in a downwardly direction from the downward-facing surface to contact the underlying surface on which the tile is to rest and separate the downward-facing surface from the underlying surface. A cap is coupled to a surface of the base opposite the downward-facing surface comprising the feet.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

BRIEF DESCRIPTION OF SEVERAL VIEWS OF THE DRAWING

The invention may take physical form in certain parts and arrangement of parts, embodiments of which will be described in detail in this specification and illustrated in the accompanying drawings which form a part hereof and wherein.

DETAILED DESCRIPTION OF THE INVENTION

Figure 1:
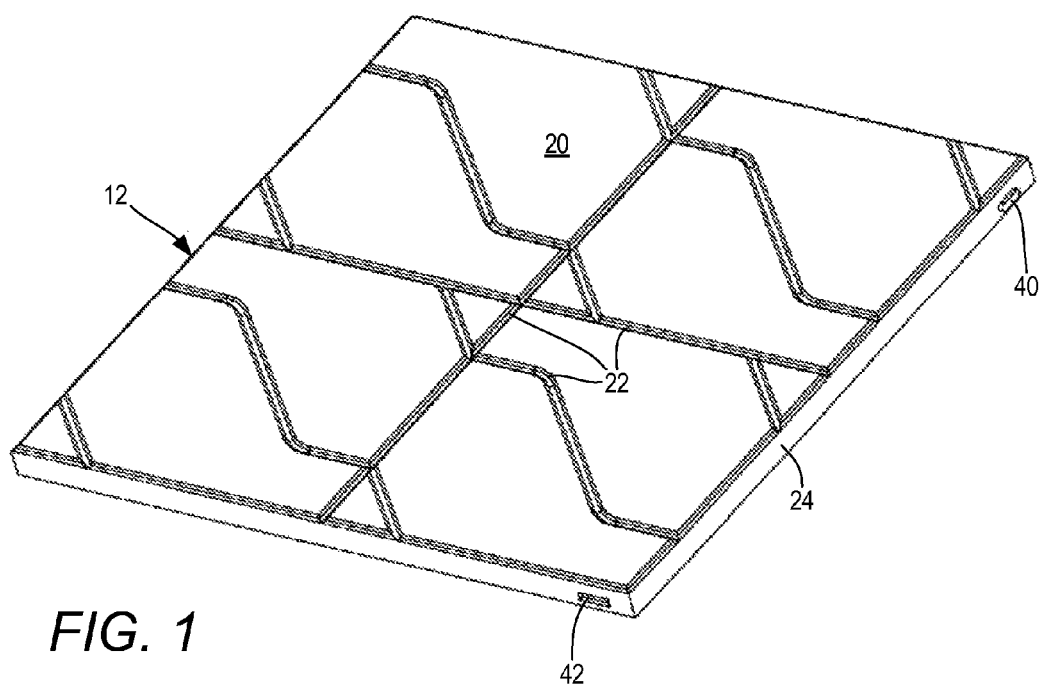
FIG. 1 is a perspective view of an exposed surface of a cap portion of a multi-component tile.

Certain terminology is used herein for convenience only and is not to be taken as a limitation on the present invention. Relative language used herein is best understood with reference to the drawings, in which like numerals are used to identify like or similar items. Further, in the drawings, certain features may be shown in somewhat schematic form.

It is also to be noted that the phrase "at least one of", if used herein, followed by a plurality of members herein means one of the members, or a combination of more than one of the members. For example, the phrase "at least one of a first widget and a second widget" means in the present application: the first widget, the second widget, or the first widget and the second widget. Likewise, "at least one of a first widget, a second widget and a third widget" means in the present application: the first widget, the second widget, the third widget, the first widget and the second widget, the first widget and the third widget, the second widget and the third widget, or the first widget and the second widget and the third widget.

Figure 5:
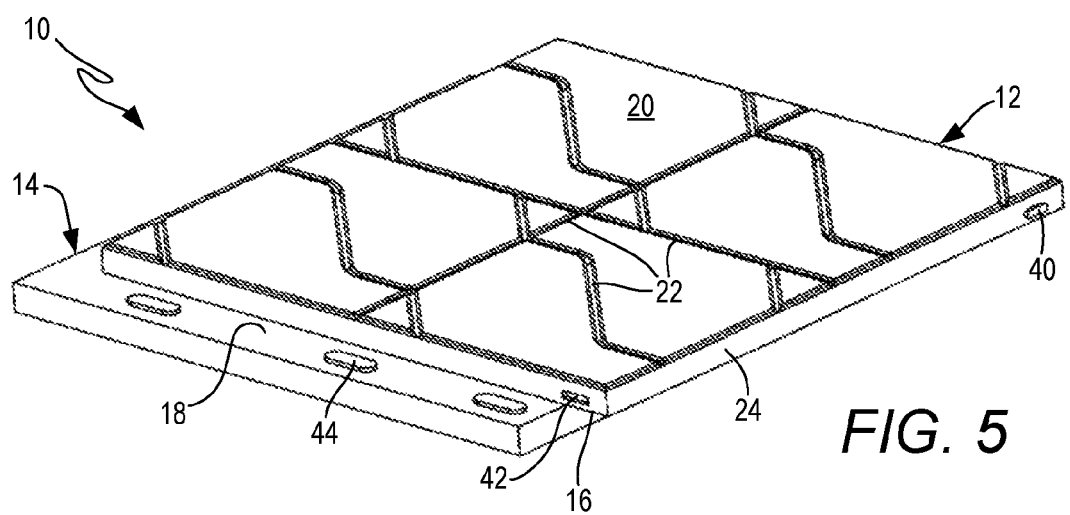
FIG. 5 is a perspective view of an assembled multi-component tile comprising a cap installed in an offset manner on a base to overlap a portion of a base provided to an adjacent tile.

FIG. 5 is a perspective view of an assembled multi-component tile 10 comprising a cap 12 installed in an offset manner on a base 14 to allow an overhanging portion 16 of the cap 12 to overlap a protruding portion 18 of a base 14 provided to a similar, adjacent tile 10. The overlap between one tile 10 and a neighboring tile 10 interferes with the passage of water and other liquids between the tiles 10 to the underlying surface.

Figure 2:
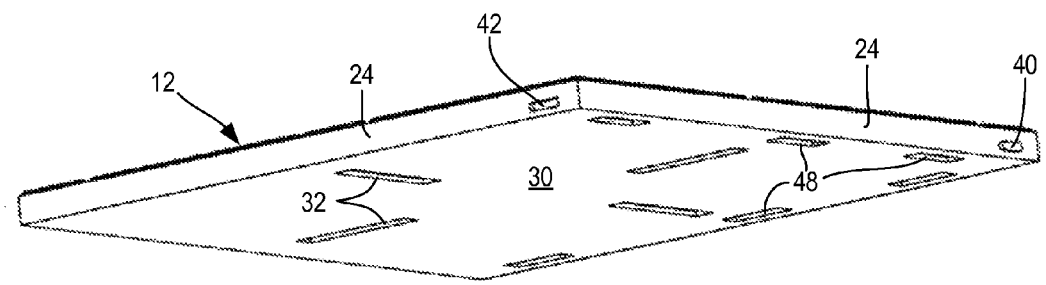
FIG. 2 is a perspective view of an underside of the cap portion of the multi-component tile in FIG. 1, the underside comprising a first portion of an alignment system that cooperates with a second portion of the alignment system provided to a top surface of a base to interfere with relative movement of the cap relative to the base.

A perspective view of the cap 12 is shown in FIGS. 1 and 2. The cap 12 can be formed by compression molding a recycled rubber material with a urethane binder, for example, to include a fluid-draining topography on an outwardly-exposed surface 20. Reinforcing materials such as ground rice hulls, basalt fibers, glass fibers, and/or a plurality of different sized rubber particles can be introduced into the material matrix and disbursed throughout. A particulate matter such as sand, aluminum oxide, or other material of small particle size can optionally be distributed over, or otherwise provided to the outwardly-exposed surface 20 to enhance vehicle and/or pedestrian traction. Further, an additive such as a UV resistant substance and/or pigment or other color-altering material can optionally be incorporated into the cap matrix during molding, and/or optionally applied to the outwardly-exposed surface 20 to afford the resulting cap 12 with a desired UV resistance and/or aesthetic appearance. Other examples of the additive include: a smoke inhibitor that reduces smoke emissions to levels below those exhibited by the cap in the absence of the smoke inhibitor in the event the cap 12 is burned such as aluminum tri hydrate ("ATH") powder, for example; and a flame retardant such as a halogen-containing liquid or any suitable P-30 flame retardant substance. Molding the cap 12 from a material matrix comprising a mixture of each such material distributed throughout allows the cap 12 to maintain a desirable aesthetic appearance and material properties despite damage (e.g., cuts, scrapes, etc.) that may occur to the outwardly-exposed surface on which pedestrians walk or other objects are transported.

A specific example of the cap 12 can be formed of a molded crumb rubber composition, with dimensions of approximately fifteen (15 in.) inches in width, twelve (12 in.) inches in height, and one and a half (1.5 in.) inches in depth. Crumb rubber compositions, as used herein, comprise recycled rubber from discarded vehicular tires, with steel and other non-rubber materials removed and ground into a small particle size (e.g., no greater than 60 mesh, no greater than 50 mesh, no greater than 40 mesh, no greater than 30 mesh, no greater than 20 mesh, no greater than 10 mesh, etc.). A cap 12 formed from such a material can have physical properties such as those in Table 1 below.

TABLE 1

Physical Properties of Crumb Rubber Slab

| Property | Test Method | Results |
| --- | --- | --- |
| Tensile Strength | ASTM D614 Procedure A - Sample Type D412 | 496 ± 70 psi |
| Elongation | | 108 ± 10% |
| Tear Strength | ASTM D618 Procedure A - Sample Type Die C | 144 ± 8 lb/in |
| Maximum Flexural Strength | ASTM D790 Procedure A | 79 ± 3 psi |
| Flexural Modulus | | 1309 ± 38 psi |
| Specific Gravity | ASTM D792 Method A | 1.1370 ± 0.0055 |

Figure 12:
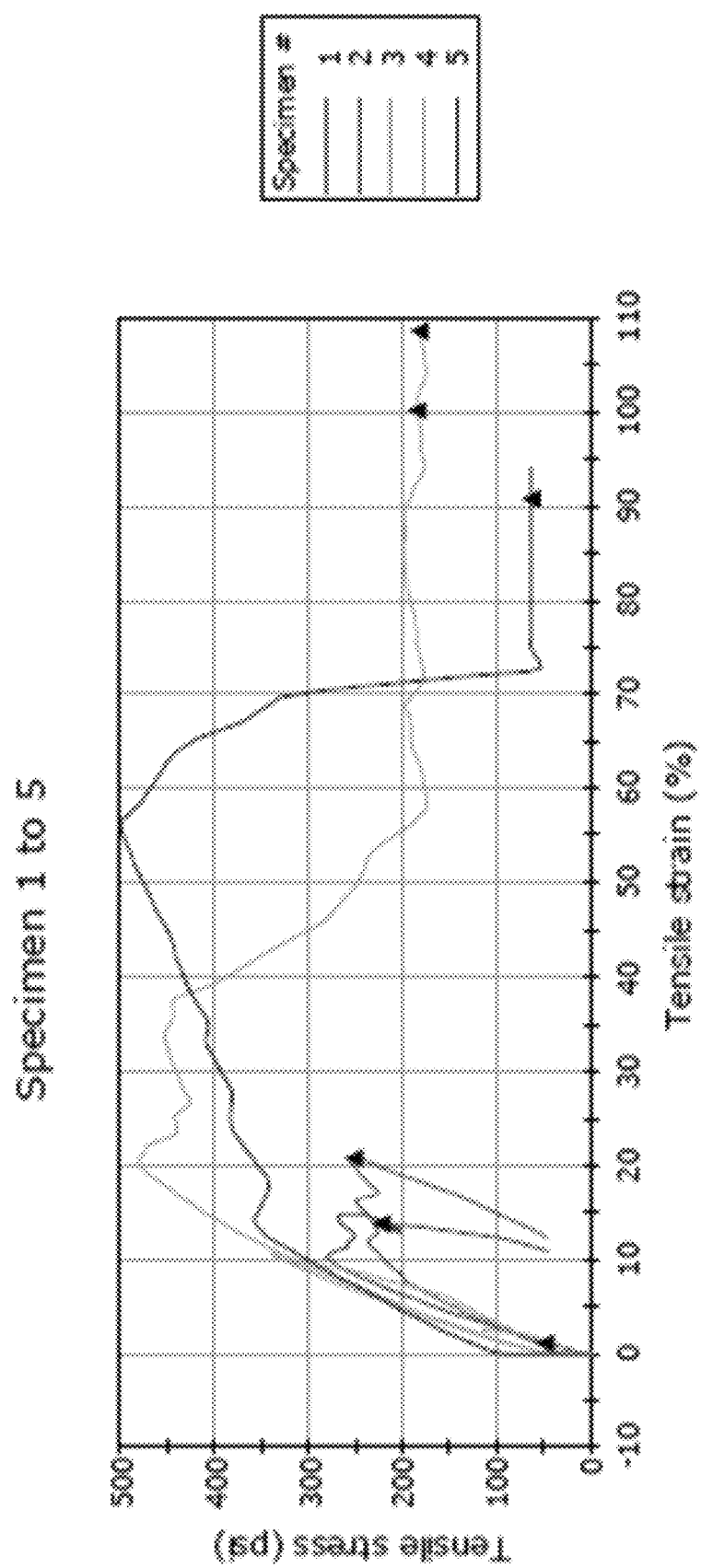
FIG. 12 shows the results of tests to illustrate tensile stress v. tensile strain of five samples.

Tests for tensile, elongation and modulus conducted in accordance with ASTM D412 for the specific example yielded the results shown in FIG. 12, the numerical values determined during the testing are tabulated in Table 2, below.

TABLE 2

| | Thickness (mm) | 100% Modulus (psi) | 200% Modulus (psi) | 300% Modulus (psi) | Energy at Break (in-lbf) | Tensile stress at Break (psi) | Elongation at Break (%) |
| --- | --- | --- | --- | --- | --- | --- | --- |
| 1 | 4.80 | — | — | — | 1.74 | 252.85 | 20.72 |
| 2 | 5.00 | — | — | — | 1.21 | 223.58 | 13.78 |
| 3 | 6.50 | — | — | — | 0.35 | 49.75 | 1.11 |
| 4 | 6.60 | 185.1 | — | — | 17.60 | 183.22 | 108.50 |
| 5 | 6.60 | — | — | — | 17.24 | 64.05 | 90.64 |
| Mean | 5.90 | 185.1 | — | — | 7.63 | 154.69 | 46.95 |
| Standard Deviation | 0.92 | — | — | — | 8.95 | 92.77 | 48.96 |

The fluid-draining topography can include a network of channels 22 formed in the outwardly-exposed surface 20 into which water or another liquid deposited onto the outwardly-exposed surface 20 can run. The channels 22 are optionally arranged in a repeating pattern such that a terminal portion of the channels 22 at the periphery 24 of the cap 12 are aligned with a terminal portion of the channels 22 at the periphery of a cap 12 provided to a neighboring tile 10, when such tiles 10 are properly aligned utilizing the posts 44 and receivers 48 described below. Channels 22 so aligned allow runoff from one tile 10 to exit the channels 22 and enter the aligned channels 22 of the neighboring tile 10 toward a drainage location where the runoff can be drained from the tiles 10. Although the neighboring tiles 10 do not necessarily form a water-tight seal there between, a majority of the water or other liquid exiting the channels 22 of a first tile 10 will enter the channels 22 of a second, neighboring tile 10. Further, any optional grout, compressed limestone, or other suitable fillers introduced between adjacent tiles 10 can further interfere with the passage of water and other liquids there between.

Alternate embodiments of the outwardly-exposed surface 20 can include apertures in which one or a plurality of illumination devices can be arranged. For instance, a LED light can be at least partially embedded in each of a plurality of apertures formed in the outwardly-exposed surface 20. Wires for supplying the LEDs with electric energy can be fully embedded within the cap material, with a connector exposed at the periphery 24 of the cap 12 to facilitate the formation of a complete electric circuit across a plurality of tiles 10. Yet other embodiments of the tile 10 can include a self-contained, on-board energy source such as a battery, to illuminate illumination device(s) provided to that tile 10, and optionally to at least one other tile 10.

FIG. 2 offers a perspective view of an underside 30 of the cap 12 shown in FIG. 1. The underside 30 includes a female receiver 32 of an alignment system that cooperates with a compatible male protrusion 36 (FIG. 3) of the alignment system provided to a top surface 38 of the base 14. Cooperation between the female receiver 32 and the male protrusions 36 interferes with relative movement (e.g., rotation, sliding, etc.) of the cap 12 relative to the base 14 once the cap 12 has been properly installed. The mating female receivers 32 and the male protrusions 36 also help to position the cap 12 on the base 14 to ensure that a suitable overhanging portion 16 (FIG. 5) of the cap 12 is formed to overlap, and cooperate with a protruding portion 18 (FIG. 5) of a base 14 provided to a similar, adjacent tile 10 as described herein. When the compatible portions of the alignment system are properly mated, the male protrusions 36 extend into the female receivers 32, and substantially planar portions of the underside 30 of the cap 12 rest flat against planar portions of the top surface 38 of the base 14. An adhesive, sealant, etc. . . . can optionally be applied to the base 14 and/or cap 12 to be disposed at the interface between the cap 12 and the base 14 to resist removal of the cap 12 from the base 14, once installed, and optionally interfere with the intrusion of water or other liquids into the female receivers 32 between the periphery of the female receivers 32 and the male protrusions 36.

According to alternate embodiments, the cap 12 can optionally be integrally molded together with the base 14 from the same, or different materials as part of a common molding process to form a monolithic, single-piece construction. Multi-component compression molding establishes a chemical and/or mechanical bond between the materials forming the cap 12 and the base 14.

Although the alignment system is described above as including female receivers 32 provided to the underside 30 of the cap 12 and male protrusions 36 extending from the top surface 38 of the base 14, the tile 10 disclosed herein is not so limited. According to other embodiments, the underside 30 of the cap 12 can optionally include at least one male protrusion 36 and the top surface 38 of the base 14 can include at least one compatible female receiver 32. According to yet other embodiments, the underside 30 of the cap 12 and the top surface 38 of the base 14 can optionally each be provided with a combination including at least one female receiver 32 and at least one male protrusion 36 that cooperate with compatible features provided to the other one of the underside 30 and the top surface 38. For the sake of brevity and to clearly describe the tile 10, however, the underside 30 of the cap 12 will be described as including the female receivers 32 and the top surface 38 of the base 14 will be described as including the male protrusions 36.

The periphery 24 of each cap 12 (e.g., lateral surfaces forming a perimeter that abuts a similar surface of a neighboring cap 12) can optionally also include a first portion 40 and a second portion 42 of an interconnecting system. Similar to the alignment system described above, the first and second portions 40, 42 can include at least one female receiver and at least one male protrusion. The first portion 40 is illustrated and described as a male protrusion and the second portion 42 as shown and described as a female receiver provided to a different surface of the periphery 24 than the first portion 40. But again, for brevity and clarity, the first and second portions 40, 42 can include any cooperating structures that interact with each other to establish a desired alignment of adjacent tiles 10 without departing from the scope of the present disclosure. As shown in FIG. 5, the first portion 40 extends from a portion of the periphery 24 that protrudes outwardly beyond the extent of the underlying base 14 of the assembled tile 10 to form the overhanging portion 16. Similarly, the second portion 42 can be formed at another portion of the periphery 24, different than the portion of the periphery 24 provided with the first portion 40 of the interconnecting system, but optionally still forming a portion of the overhanging portion 16.

Figure 3:
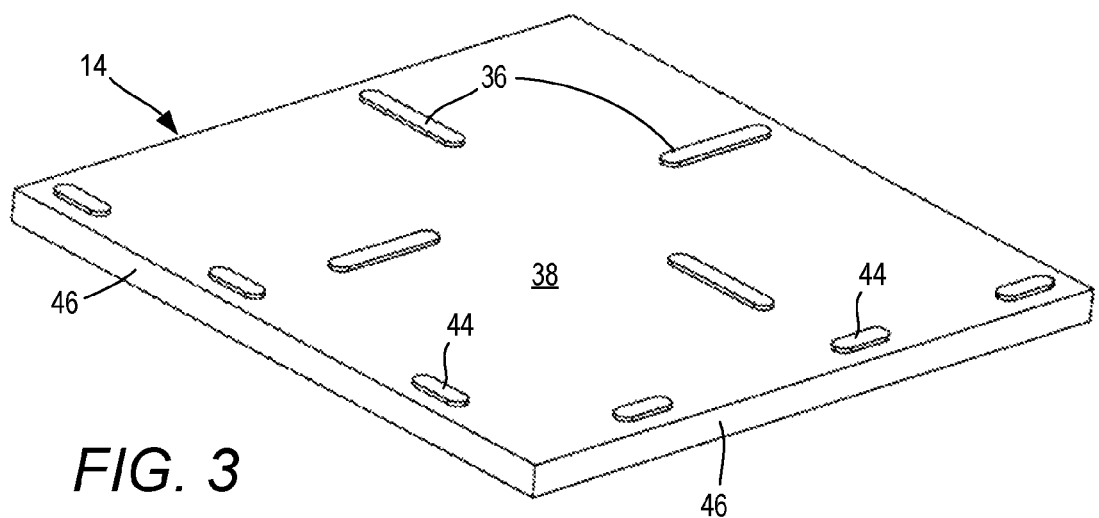
FIG. 3 is a perspective view of a top surface of the base comprising the second portion of the alignment system that cooperates with the first portion of the alignment system appearing in FIG. 2.

An embodiment of the top surface 38 of the base 14 shown in FIG. 3 also includes a plurality of connecting posts 44. The posts 44 can optionally be arranged along a single border 46 of the base 14, or can optionally be arranged along a plurality of borders 46 of the base 14 as shown in FIG. 3. Arranging the posts 44 along a plurality of the borders 46 allows different borders 46 of the base 14 to receive the overhanging portion 16 of an adjacent tile 10, thus enabling users to form different geometric patterns of the tiles 10 to create the desired aesthetic appearance of the overall installation.

Referring once again to FIG. 2, the underside 30 of a portion of the cap 12, particularly the overhanging portion 16, is also provided with compatible receivers 48 corresponding in number, arrangement and shape to the posts 44 provided to the base 14. Similar to the posts 44, the receivers 48 can optionally be arranged to extend adjacent to and along different portions of the periphery 24 to facilitate the desired arrangement of the tiles 10 relative to each other, thereby achieving the desired aesthetic appearance of the overall installation. Once again, the embodiments described in detail herein include posts 44 extending upwardly from the base 14 and a corresponding arrangement of receivers 48 formed in the underside 30 of the 12. Just as before, the posts 44 in the receivers 48 can optionally be selected as male and/or female for the 12 and the base 14. Regardless of their configuration, the posts 44 cooperate with (e.g., are at least partially received within) the receivers 48 to interfere with the lateral separation of one tile 10 from an adjacent tile 10.

Figure 4:
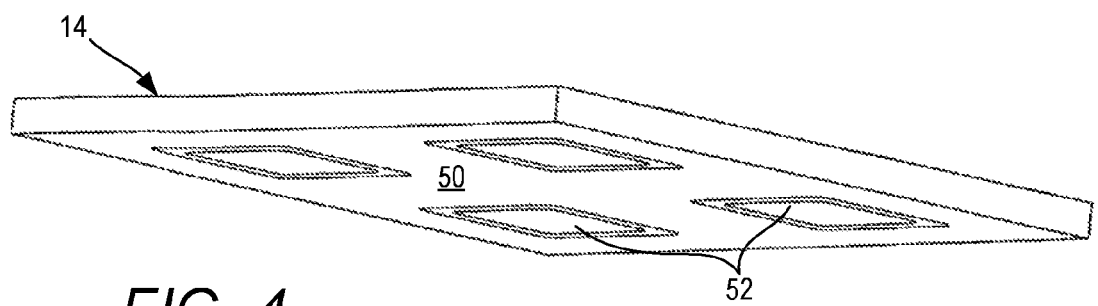
FIG. 4 is a perspective view of an underside of the base shown in FIG. 3.

In use, the base 14 can be placed on an underlying ground surface that is to be concealed by the overall installation comprising a plurality of tiles 10. An underside 50 of the base 14 can optionally be provided with gripping features 52, shown in FIG. 4, formed as apertures that can receive gravel, dirt or other material of the underlying ground on which the base 14 is placed, and/or feet extend from the underside 50 of the base 14 into the underlying ground surface, which can optionally include a sub-base material of crushed limestone, etc., to establish a desired grade and consistency. Regardless of their configuration, the gripping features 52 promote stable placement of the base 14 on the underlying ground and interfere with movement of the base 14 along the underlying ground surface once placed at the desired location.

With the first tile 10 in place, a second tile 10 can be positioned such that the overhanging portion 16 of the cap 12 arranged on the base 14 of the second tile 10 overlaps with the protruding portion 18 of the first tile 10. An adhesive, sealant or other material can optionally be applied to the protruding portion 18 and or the posts 44 extending therefrom. The receivers 48 formed in the underside 30 of the cap 12 of the second tile 10 are aligned with the posts 44 extending from the protruding portion 18 of the base 14 of the first tile 10, and the first and second portions 40, 42 of the interconnecting system are also aligned with each other. A force can then be applied to the second tile 10 to firmly seat the posts 44 of the first tile 10 within the receivers 48 in the underside of the cap 12 of the second tile 10. When properly installed, the channels 22 at the periphery 24 of the first tile 10 are aligned to form a continuous fluid flow path with the channels 22 at the periphery 24 of the second tile 10. Also, the outwardly-exposed surfaces 20 of the first and second tiles 10 should be substantially level with each other. Mortar, grout, sealant, or another material can optionally be applied to the assembly of tiles 10 to minimize the formation of any spaces between abutting, or at least opposing surfaces of the caps 12 provided to those tiles 10.

Figure 9:
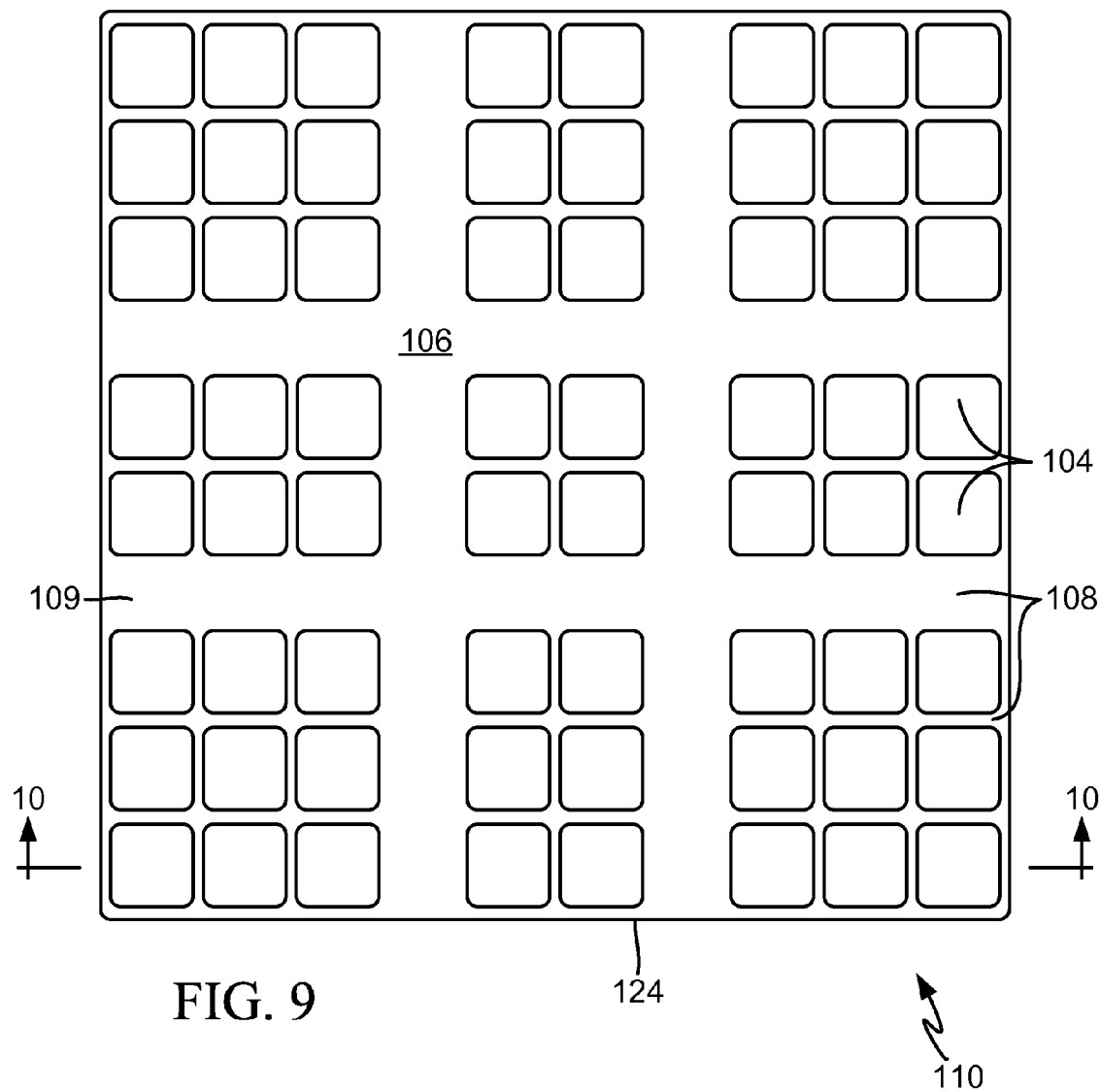
FIG. 9 shows a bottom view of an alternate embodiment of a tile comprising a plurality of feet that establish channels through which a liquid can pass between the tile and an underlying sub-base material.

FIG. 9 shows a bottom view of downward-facing surface 106 of an alternate embodiment of a tile 110 comprising a plurality of feet 104 that define channels 108 through which a liquid can pass between the tile 110 and an underlying sub-base material. The downward-facing surface 106 opposes the underlying ground or sub-base material when the tile 110 is installed. The outwardly-exposed surface 20 of the tile 110 can optionally include the fluid-draining topography provided to the tiles 10 of the aforementioned embodiments.

According to the present embodiment, the feet 104 extend downwardly, generally toward the underlying sub-base material, to elevate the downward-facing surface 106 above the sub-base material. Water and other liquids that reach the space between the downward-facing surface 106 and the sub-base material and that do not permeate the sub-base material can flow along the channels 108 to locations where such liquids can permeate the sub-base material or ground or otherwise be drained.

Figure 10:
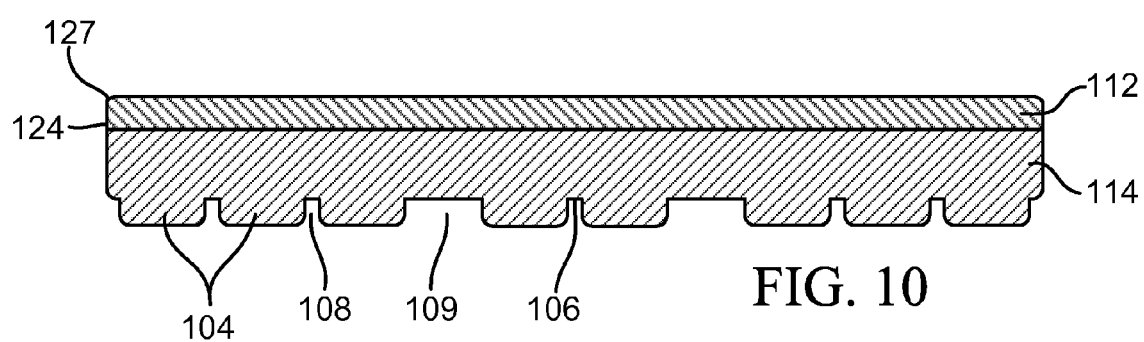
FIG. 10 shows a sectional view of the tile taken along line 10-10 in FIG. 9.

The cap 112 and the base 114 of the present embodiment can optionally be integrally formed together by a multi-component molding operation as a monolithic (e.g., single piece) structure, as shown in FIG. 10, which is a sectional view of the tile 110 taken along line 10-10 in FIG. 9. The cap 112 can optionally be formed from any suitably-durable material such as synthetic ethylene propylene diene monomer ("EPDM") rubber. Again, desired pigments, dyes, or other coloring agents can be incorporated in the EPDM rubber so the visible color extends throughout the cap 112, rendering any damage to the outwardly-exposed surface 20 difficult to discern visibly. Similarly, at least one of a traction-enhancing material, an ultraviolet stabilizer, and any other additive can be incorporated into the EPDM rubber to compression mold the cap 112. The base 114 can be formed from a reinforced composition comprising crumb rubber (e.g., approximately 50-90% post-consumer recycled tire rubber, or approximately 75-85% post-consumer recycled tire rubber, or approximately 80% post-consumer recycled tire rubber), unprocessed or ground rice hulls, basalt fibers, glass fibers, and other additives. The composition of the base 114 comprising crumb rubber and rice hulls, for example, contracts approximately the same extent, and optionally at approximately the same rate as the composition of the cap 112. Thus, buckling of the cap 112 and/or base 114 or other damage resulting from temperature fluctuations can be minimized. The resulting tile 110 can also have load bearing properties exhibiting no deflection at 50 psi, and/or deflection of no greater than approximately one eighth (⅛ in.) of an inch without experiencing plastic deformation under a load of 250 psi. Tiles 110 of various different heights (measured from the bottom of the feet 104 to the outwardly-exposed surface 20) ranging from approximately 0.5 inch to approximately 1.5 inches or more can be created in this manner. For example, tiles 110 with a height of approximately ⅝ inch can be installed on existing decks, patios, porches, and other surfaces that will support only foot traffic and having a rigid substrate as the underlying surface. Similarly, tiles 110 with a height of approximately ¾ inch are suitable for installation on rooftops and existing garage floors and other surfaces that will support objects heavier than people. And 1-1.5 inch tiles 110 can be installed for new installations of patios, walkways, pool decks, dog pens, dumpster pads, etc.

Unlike the embodiments discussed above, the cap 112 can optionally be centrally mounted on the base 114. In other words, the cap 112 and the base 114 can share a common periphery 124 with the same, or at lease similar dimensions to eliminate the overhanging portions 16 and the protruding portions 18. The upper periphery of the cap 112 can include radiused or rounded edges 127. When the tiles 110 are installed as described below, the periphery 124 forms a seal with an opposing periphery 124 provided to a neighboring tile 110 that allows approximately 1 gallon of water at room temperature at sea level to pass between tiles 110 in approximately 21 seconds. Such tiles 110 can be arranged side by side to abut against each other.

Illustrated in FIGS. 9 and 10, some of the channels 108 can optionally have a widthwise dimension that is greater than the widthwise dimension of other channels 108. Although the channels are generally referred to herein at 108, the relatively-wide channels will be specifically referred to as 109 to clearly distinguish between the relatively-wide and relatively-narrow channels. The relatively-wide channels 109 have suitable dimensions to receive a portion of a connection member 132, shown in FIG. 11, that can be utilized to coupled adjacent tiles 110 together and interfere with their lateral separation from each other.

Figure 11:
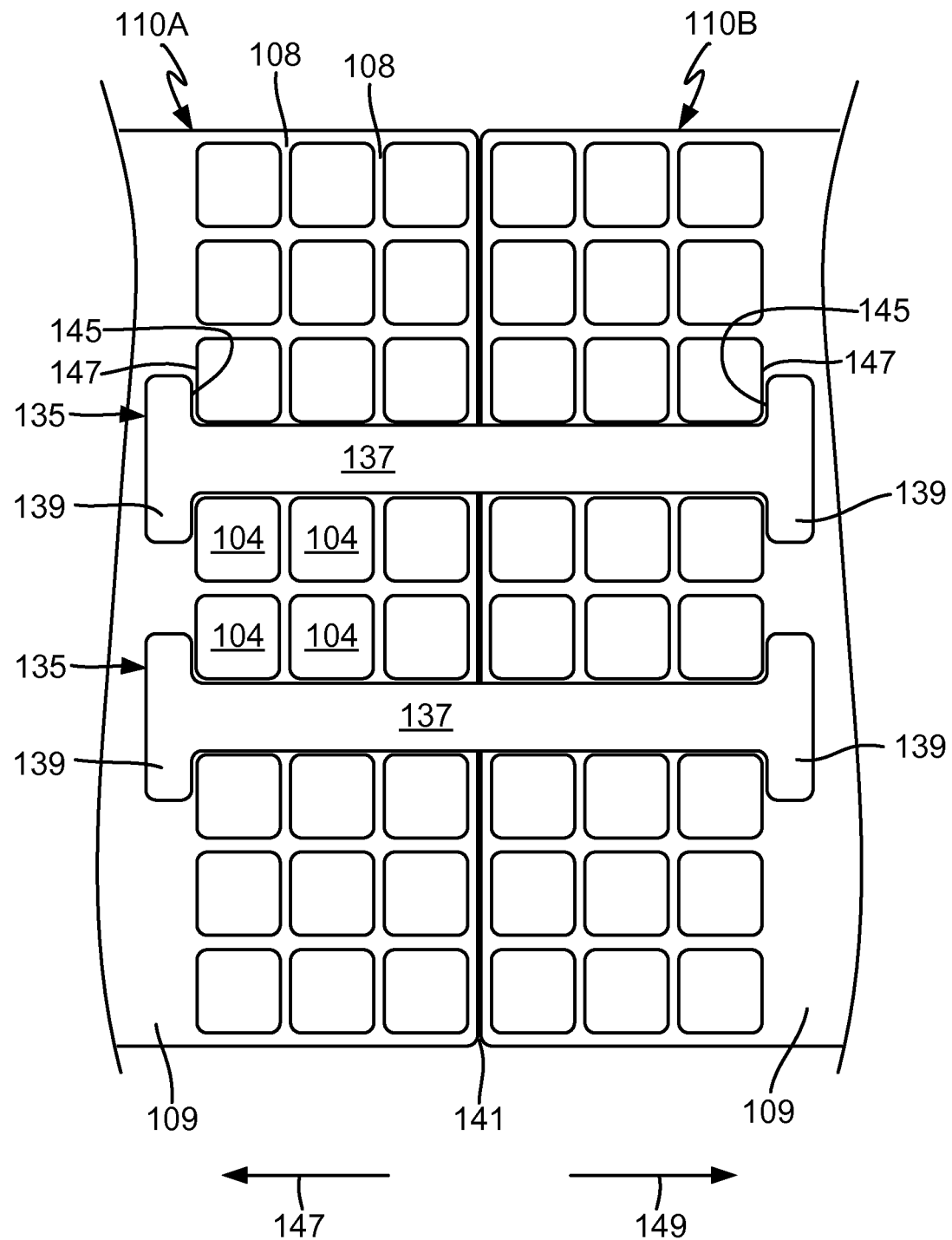
FIG. 11 shows two edge-aligned tiles aligned and coupled together utilizing connection members disposed within apertures defined between downward-extending feet that elevate the tile above a sub-base material.

FIG. 11 shows a partially-cutaway view of two edge-aligned tiles 110A, 110B aligned and coupled together utilizing connection members 135 disposed within the relatively-wide channels 109 defined between downward-extending feet 104. As shown, the connection member 135 are substantially "I" shaped, including an elongated region 137 and two transverse regions 139 arranged at opposite ends of the elongated region 137. The elongated region is of sufficient length to extend along the wide channel 109 of each adjacent tile 110A, 110B and position each transverse region 139 within a wide channel 109 or other suitably-sized channel extending substantially orthogonal to that channel 109 in which the elongated region 137 is disposed. To minimize the formation of a gap at the interface 141 between the tiles 110A, 110B (e.g., to minimize separation of the tiles 110, 110B from each other), the length of the elongated region 137 causes an interior flange surface 145 of the transverse regions 139 to closely oppose, and optionally abut against outwardly-oriented faces of feet arranged on opposite sides of the elongated region. Accordingly, the connection member 135 counters separation forces urged on one or both tiles 110A, 110B away from the other in the direction of arrows 147, 149, respectively, thereby maintaining the close spatial arrangement of those tiles 110A, 110B relative to each other. And since the feet 14 are symmetrically arranged on each tile 110A, 110B, a linear arrangement of tiles 110 can quickly be established.

Although the connection member 135 is shown in FIG. 11 and described herein as an "I" shaped member, the present disclosure is not so limited. A connection member 135 of any suitable shape and size to cooperate with one or more feet 104 provided to the base 114 to couple tiles 110 together will suffice. For example, the connection member 135 can be configured to fit within channels 108 that all of the same dimensions, rather than only within relatively-wide channels 109. Further, although a plurality of connection members 135 are shown, a single connection member 135 may be sufficient to maintain the relative arrangement between tiles 110, particularly if the tiles 110 are coupled together in more than one dimension in a two-dimensional array on an underlying sub-base surface. Further, the connection member 135 can optionally be fully concealed from by the tiles 110 coupled together. Additionally, the pattern of the feet 104 provided to each base 114 can optionally form channels 108 that establish a linear arrangement of the tiles 110, a staggered arrangement of tiles 110 such that the edge of one tile 110 is arranged adjacent to a midsection of a neighboring tile 110, or any other desired arrangement of the tiles 110.

Figure 6:
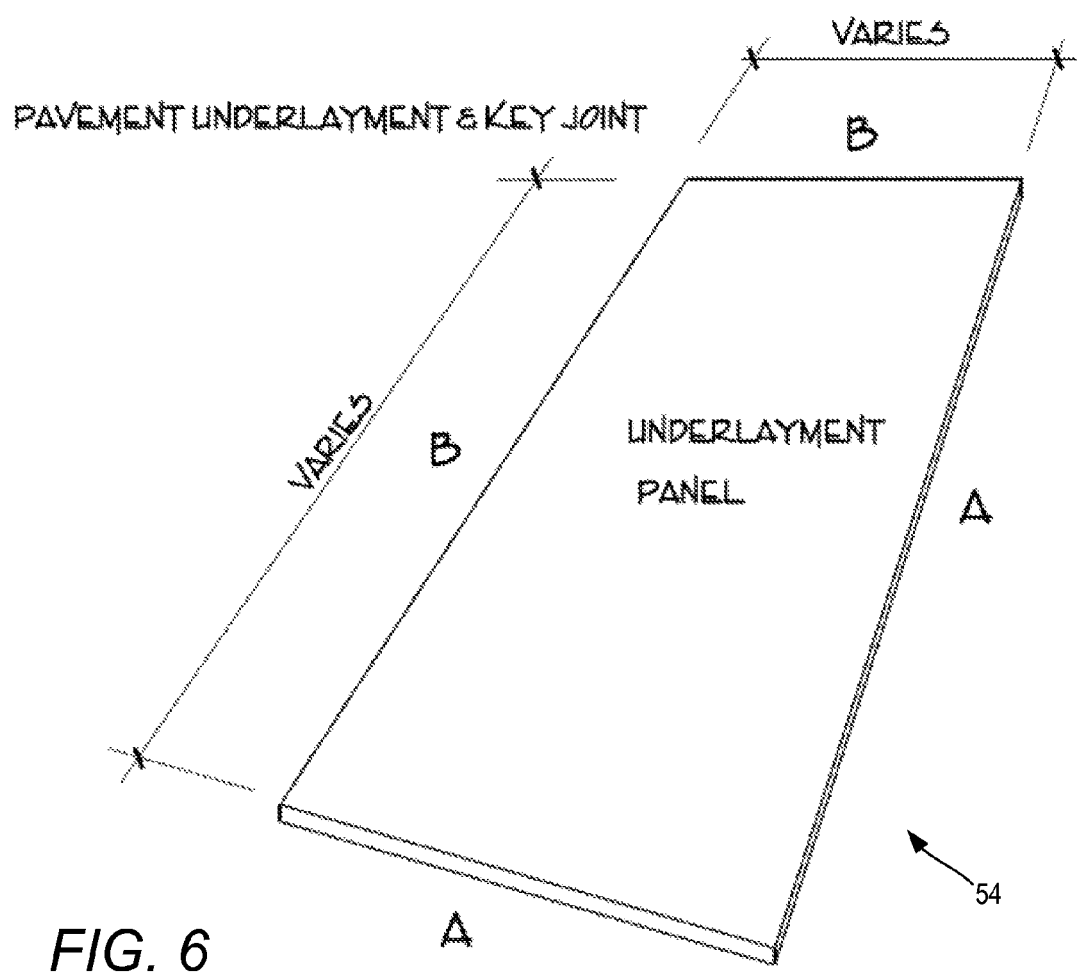
FIG. 6 shows a perspective view of an underlayment panel on which a plurality of tiles can be installed.

According to alternate embodiments, a pavement separator panel 54 such as that shown in FIG. 6 can optionally be placed on the ground surface, to act as a subfloor on which installed new asphalt or other pavement surface is to be applied. Accordingly, the pavement separator panel 54 can be placed directly onto the exposed surface of existing, deteriorated pavement that may include cracks and other damage. Placing the pavement separator panel 54 on the deteriorated pavement to separate the newly-applied asphalt or other pavement surface from the degraded pavement interferes with the transmission of cracks from the existing pavement up through the new asphalt surface. To create a new pavement surface according to the present embodiment, pavement separator panels 54 can be placed on the deteriorated pavement, with the edges of contiguous pavement separator panels 54 coupled together as described with reference to FIGS. 7 and 8, below. Once the pavement separator panels 54 are placed over the desired area and the edges mated with each other, the new pavement material such as asphalt, for example, can be applied over top of the pavement separator panels 54.

Figure 7:
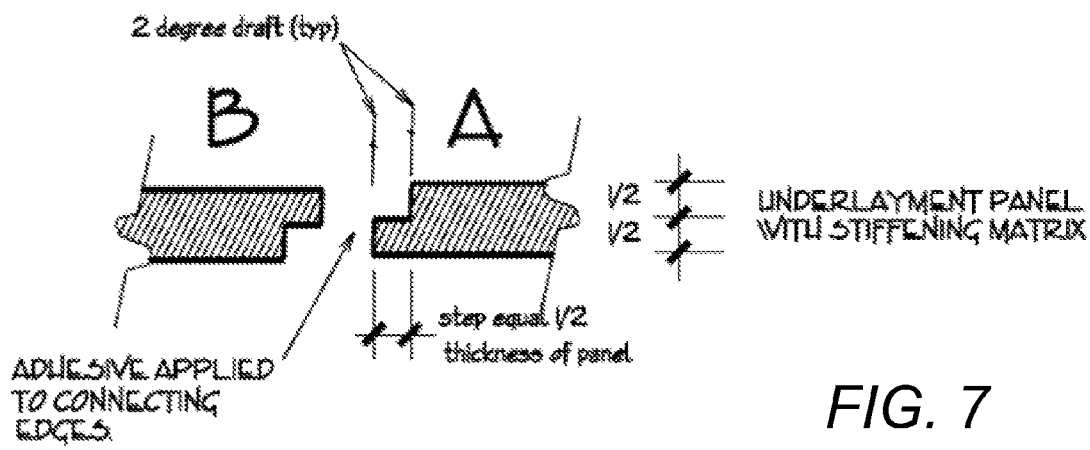
FIG. 7 shows an illustrative embodiment of a joint that can be established by edges of neighboring underlayment panels.

Regardless of the installation, the underlayment panel 54 can be formed of any suitably durable and rigid material to form a flat surface suitable for the particular installation. The underlayment panel 54 can be of any size suitable to support a desired area of new pavement, and includes at least one, and optionally two or more pairs of connecting edges A, B. The connecting edges A, B, allow a plurality of underlayment panels 54 to be arranged over the ground surface and connected together. For example, as shown in FIG. 7, the connecting edges A, B include cooperating portions of a lap joint. According to such a structure, in adhesive can be applied to one or both of the edges A, B and the overlapping mating surfaces brought together. The adhesive, once cured, interferes with separation of the neighboring underlayment panels 54.

Figure 8:
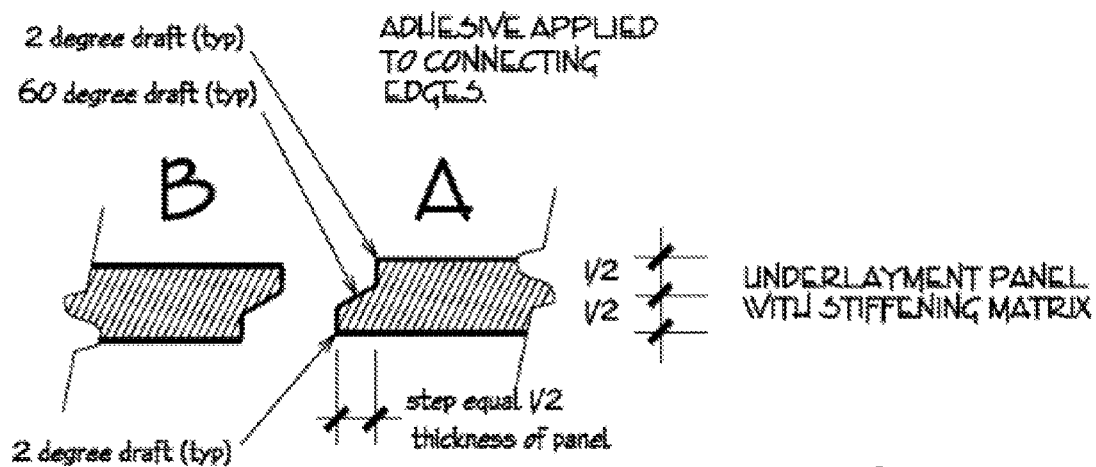
FIG. 8 shows another illustrative embodiment of a joint that can be established by edges of neighboring underlayment panels.

An alternate embodiment of the joint that can be established by the edges A, B is shown in FIG. 8. Similar to the previous embodiment, an adhesive can be applied to one or both of the connecting edges A, B, and those edges A, B brought together. Unlike the embodiment described with reference to FIG. 7, the present embodiment forms a hybrid lap joint where each overlapping portion comprises an angled interface surface instead of a horizontal configuration of such surface.

Illustrative embodiments have been described, hereinabove. It will be apparent to those skilled in the art that the above devices and methods may incorporate changes and modifications without departing from the general scope of this invention. It is intended to include all such modifications and alterations within the scope of the present invention. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A tile comprising:
 a base comprising a downward-facing surface that is to oppose an underlying surface on which the tile is to rest, the base being formed from a material comprising a combination of crumb rubber and rice hull material;
 a plurality of feet extending in a downwardly direction from the downward-facing surface to contact the underlying surface on which the tile is to rest and separate the downward-facing surface from the underlying surface; and
 a cap coupled to a surface of the base opposite the downward-facing surface comprising the feet.

2. The tile of claim 1, wherein the feet are integrally formed as part of a monolithic unit with the base.

3. The tile of claim 1, wherein the feet define channels extending along the downward-facing surface through which a liquid can flow between the downward-facing surface and the underlying surface.

4. The tile of claim 3 further comprising a connection member that is compatible to cooperate with the feet to couple the tile adjacent to a neighboring tile.

5. The tile of claim 1, wherein the cap comprises an overhanging portion and the base comprises a protruding portion.

* * * * *